United States Patent
Crickmore et al.

(10) Patent No.: US 7,050,172 B2
(45) Date of Patent: May 23, 2006

(54) OPTICAL SENSING APPARATUS

(75) Inventors: Roger I Crickmore, Dorchester (GB); David I Curtis, Salisbury (GB)

(73) Assignee: QinetiQ Limited, Farnborough (GB)

( * ) Notice: Subject to any disclaimer, the term of this patent is extended or adjusted under 35 U.S.C. 154(b) by 341 days.

(21) Appl. No.: 10/465,799

(22) Filed: Jun. 20, 2003

(65) Prior Publication Data
US 2006/0028650 A1  Feb. 9, 2006

(30) Foreign Application Priority Data
Jun. 21, 2002  (GB) .................................. 0214293

(51) Int. Cl.
*G01B 9/02* (2006.01)

(52) U.S. Cl. .................................... 356/477

(58) Field of Classification Search ............... 356/477, 356/479, 480, 484, 519; 250/227.14, 227.19, 250/227.27
See application file for complete search history.

(56) References Cited

U.S. PATENT DOCUMENTS 4,307,618 A * 12/1981 James et al. ............. 73/861.21
4,918,492 A * 4/1990 Ferdinand et al. .......... 356/477
6,630,658 B1 * 10/2003 Bohnert et al. ........ 250/227.14

FOREIGN PATENT DOCUMENTS

| GB | 2 299 203 | 9/1996 |
|----|-----------|--------|
| GB | 2 308 888 | 7/1997 |
| WO | WO 94/17366 | 8/1994 |
| WO | WO 02/19903 | 3/2002 |
| WO | WO 02/044672 | 6/2002 |

* cited by examiner

*Primary Examiner*—Gregory J. Toatley, Jr.
*Assistant Examiner*—Michael A. Lyons
(74) *Attorney, Agent, or Firm*—Nixon & Vanderhye P.C.

(57) ABSTRACT

Optical sensing apparatus (10) for measuring the temperature and flow-rate of a fluid comprises a DFB fibre-laser (20) and an AO modulator (16) for modulating the power of pump radiation delivered thereto. Modulated pumping results in cyclical heating of a grating structure in the fibre-laser and hence wavelength variations in laser radiation output therefrom. The temperature and flow-rate of a fluid surrounding the fibre-laser may be inferred from the wavelength excursion and the minimum value of the wavelength respectively. The invention provides simple optical sensing apparatus capable of providing measurements of both the temperature and the flow-rate of a fluid.

22 Claims, 4 Drawing Sheets

OPTICAL SENSING APPARATUS

BACKGROUND OF THE INVENTION

1. Field of the Invention

The present invention relates to optical sensing apparatus.

Optical sensing apparatus, that is, sensing apparatus comprising one or more optical sensing elements, is useful for obtaining information on physical conditions within environments in which electromagnetic emissions are undesirable or dangerous. Optical sensing elements are robust and require little or no maintenance as they have no moving parts. For example a sensing element of a fibre-optic strain sensor consists only of a length of optical fibre; conditions external to the sensing element are inferred from changes in charateristics, such as amplitude, frequency or polarisation, in light received from fibre.

2. Discussion of Prior Art

International application PCT/CH99/00607 (international publication number WO 00/39552 discloses optical sensing apparatus having a sensing element consisting of a fibre laser. The fibre laser is birefringent to an extent which depends on a pressure difference experienced by different parts of the fibre laser. The birefringence, and hence the pressure difference, is inferred from beat frequencies between polarisation modes of the fibre-laser. The sensor system may be used to measure the flow rate of fluid; however this requires use of a Venturi tube, which adds to the complexity of the apparatus. Furthermore, the apparatus is not capable of additionally providing data relating to the temperature of the fluid.

SUMMARY OF THE INVENTION

It is an object of the present invention to provide optical sensing apparatus of simple construction and which is capable of delivering measures of both the flow-rate and temperature of a fluid.

According to a first aspect of the present invention, this object is achieved by optical sensing apparatus comprising (i) an optical fibre having a length the core of which contains a reflective grating structure, (ii) means for producing signal radiation in the core of the optical fibre, and (iii) means for obtaining a measure of the wavelength of signal radiation reflected by the grating structure, characterised in that the apparatus further comprises heating means for cyclically heating the core of said length of the optical fibre at a frequency such that parameters of the cyclical heating are influenced by the temperature and flow-rate of a fluid in which said length of optical fibre is immersed.

Conveniently, the parameters comprise (i) the difference between the maximum and minimum temperatures of the core of said length of the optical fibre, which is influenced by the flow-rate of the fluid and (ii) the minimum temperature of the core of said length of the optical fibre, which is influenced by the temperature of the fluid.

Preferably the heating means comprises a source of radiation coupled to the core of the optical fibre, a modulator for modulating the power of radiation emitted by the source and coupled to the core of the optical fibre, and absorbing species located in the core of the optical fibre for absorbing radiation from the source, the absorbing species being substantially co-located with the reflective grating structure. This allows cyclical heating to be effected using standard optical components.

Advantageously the modulator is operable to modulate the power of radiation which is output by the source and absorbed in said length of the optical fibre at first and second modulation frequencies, such that modulation at the second modulation frequency results in cyclical heating of said length of the core of the optical fibre wherein the difference between the maximum and minimum temperatures of the core of said length of the optical fibre, and the minimum temperature thereof, are not influenced by the temperature or flow-rate of the fluid. This allows for measures of flow-rate to be corrected for instabilities in the output power of radiation from the source. Conveniently, means may be provided for periodically chirping the operating frequency of the modulator between the first and second frequencies.

Preferably, said length of the optical fibre is comprised in a fibre-laser, the absorbing species and the wavelength of radiation from the source being compatible for achieving laser oscillation therein, and the signal radiation is laser radiation of the fibre-laser. This provides simple sensing apparatus as no additional parts are required to generate the signal radiation. A fibre-laser has a grating at each end thereof; a length of fibre containing either grating may be immersed in the fluid, and wavelength excursions in radiation produced by, or emitted from, either grating may be measured to infer the temperature and/or flow-rate of the fluid.

Alternatively, the apparatus may further comprise a broadband radiation source coupled to the core of the optical fibre at a first position therealong and an output optical fibre coupled to the optical fibre at a second position therealong, the second position being between the first position and the position of the reflective grating structure. In this case, the broadband radiation source is preferably an LED as such devices are compact, robust, efficient and simple to operate.

The means for obtaining a measure of the wavelength of signal radiation reflected by the grating structure may comprise an interferometer (conveniently an etalon) arranged to convert wavelength excursions in reflected signal radiation into corresponding amplitude excursions therein. This allows detection of wavelength excursions using a conventional photodiode; alternatively said means may comprise a photodiode having a wavelength-dependent response or an optical spectrum analyser. Where a fibre-laser is employed, the laser may be birefringent, with fluid flow-rate and temperature being deduced from wavelength differences between polarisation modes.

According to a second aspect of the present invention, there is provided a method of measuring at least one of the temperature and the flow rate of a fluid, the method comprising the steps of:

(i) providing an optical fibre having a length the core of which contains a reflective grating structure;

(ii) immersing said length of optical fibre in the fluid;

(ii) generating signal radiation in the core of the optical fibre; and (iii) obtaining a measure of the wavelength of signal radiation reflected by the grating structure, characterised in that the method further comprises the step of cyclically heating the core of said length of the optical fibre at a frequency such that parameters of the cyclical heating are influenced by the temperature and flow-rate of the fluid.

Embodiments of the invention are described below by way of example only and with reference to the accompanying drawings in which

DETAILED DISCUSSION OF EMBODIMENTS

Figure 1:
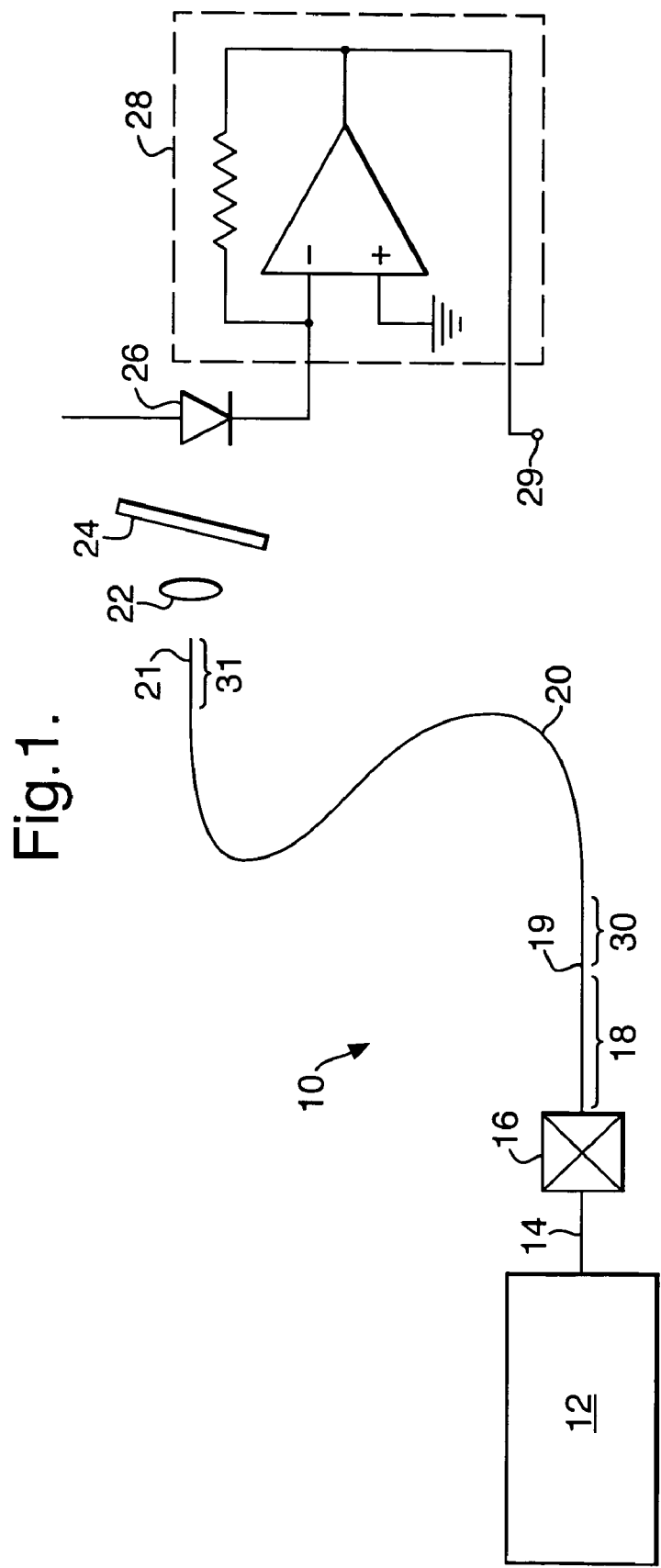
FIG. 1 shows optical sensing apparatus of the invention.

Referring to FIG. 1, optical sensing apparatus of the invention is indicated generally by 10. The sensor 10 comprises a pump source 12, optical fibres 14, 18, an AO modulator 16, a DFB fibre-laser 20, a lens 22, an etalon 24, and a photodiode 26 having an associated circuit 28. The pump source 12 is coupled to a first end 19 of the DFB fibre-laser 20 via the fibres 14, 18 and the modulator 16. The lens 22 is arranged to collect laser radiation emergent from a second end 21 of the fibre-laser 20 and to direct such radiation to the etalon 24. The photodiode 26 is arranged to detect radiation passed by the etalon 24. In use of the apparatus 10, an electrical signal is generated at an output 29 of the circuit 28; this may be analysed in real-time (for example using an oscilloscope) or recorded for later analysis. Provided lasing is achieved in the DFB fibre-laser 20, the particular choice of pump source and DFB fibre-laser is not critical. For example, the pump source 12 could be a AlGaAs diode-laser having an output wavelength in the region of 810 nm, with the DFB fibre-laser having the laser species $Nd^{3+}$ present in its core. Alternatively the lasing species could be $Er^{3+}$ with pumping provided by laser-diodes having an output wavelength of 0.98 µm (AlGaAs) or 1.49 µm (InGaAsP). The photodiode 26 must be able to detect laser radiation from the DFB fibre-laser 20; for example in the case of an $Nd^{3+}$ DFB fibre-laser, a germanium photodiode is suitable. The circuit 28 may be any standard circuit suitable for use with a photodiode (photoconductive mode operation of the photodiode 26 is illustrated in FIG. 1). The DFB fibre-laser 20 has reflective Bragg gratings 30, 31 located in its core near the ends 19, 21 which provide optical feedback required for lasing.

The apparatus 10 is operated to measure the flow rate (flow velocity) of a fluid as follows. The fibre-laser 20 is immersed in the fluid so that at least that part of the fibre-laser 20 containing the Bragg grating 19 is immersed in the fluid. The AO modulator is operated to provide sinusoidal modulation of pump radiation from the pump source 12 such that the total pump power incident on the core of the fibre-laser has a form $$P(t)=P_0+P_1 \sin \omega t \qquad (1)$$

where $P_0$ and $P_1$ are constants, $\omega$ is the pump modulation frequency and $P_0-P_1$ is greater than the threshold pump power of the fibre-laser 20 so that continuous, amplitude-modulated (AM) laser radiation is output from the end 21 of fibre-laser 20.

In addition to causing modulation in the output power of the fibre-laser 20, the modulated pump radiation also causes cyclical heating and cooling of the core of the fibre-laser 20, i.e. the temperature of the core of the fibre-laser 20 (the core temperature) under modulated pumping fluctuates and has a form $$T(t)=T_0+T_1 \cos(\omega t+\Psi) \qquad (2)$$

where $T_0$, $T_1$ and $\Psi$ are constants. The difference between maximum and minimum temperatures of the core (i.e. the excursion of the core temperature) is $2T_1$, whilst the lower bound of the temperature is $T_0-T_1$. The cyclical heating and cooling of the core of the fibre-laser 20 results in a corresponding modulation of the optical pitch of reflecting layers in the Bragg gratings 30, 31, and hence a modulation in the lasing wavelength of the fibre-laser 20. Laser radiation output from the fibre-laser 20 is therefore both frequency-modulated (FM) and amplitude modulated (AM).

For sufficiently small values of the pump modulation frequency $\omega$ $$T_1 \propto \frac{P_1}{\sqrt{v}} \qquad (3)$$

where v is the flow velocity or flow rate of the fluid, and at sufficiently high $\omega$, $$t_1 \propto P_1 \qquad (4)$$

In the case of the apparatus 10, (3) holds for $\omega < \sim 20$ Hz, whilst (4) holds good for $\omega > \sim 200$ Hz. For other embodiments of the invention, frequency regimes corresponding to (3) and (4) may be found empirically. Thus for pump modulation frequencies less than about 20 Hz, the excursion of the core temperature ($2T_1$) provides a measure of the flow-rate of the fluid. The apparatus 10 is operated in this regime in order to measure the flow-rate of the fluid.

The temperature T of the core of the fibre-laser 20 is related to the wavelength $\lambda$ of the output radiation of the fibre-laser by:

$$\ln\left(\frac{\lambda}{\lambda_0}\right) = (\alpha + \xi)T, \qquad (5)$$

where $\alpha$ is the linear expansivity of the core, 4 its thermo-optic coefficient and $\lambda_0$ is the output wavelength of the fibre-laser 20 when the core temperature is 0° C. The excursion in the temperature of the core of the fibre-laser 20 therefore gives rise to a corresponding excursion in the wavelength of laser radiation output from the end 21 of the fibre-laser (20).

Laser radiation output from the fibre-laser 20 is collected by the lens 22, passed through the etalon 24 and detected by the photodiode 26. The etalon 22 acts to produce a further amplitude modulation of the laser radiation corresponding to variations in the wavelength of laser radiation output by the fibre-laser 20. The intensity of radiation incident on the photodiode 26 therefore has a first amplitude modulation resulting from modulation in pump power which is absorbed by the fibre-laser 20 (and which gives rise to increased signal and output power), and a second amplitude modulation resulting from absorbed pump power which gives rise to core heating rather than laser output radiation. The electrical signal at the output 29 reflects both types of modulation; the former is known (as it is applied to the AO modulator 16) and is subtracted from the signal at the output 29, to provide a modified output signal having a modulation corresponding only to variations in the wavelength of laser radiation output from the fibre-laser 20, and hence (by virtue of (5)) to variations in the temperature of the core of the fibre-laser 20. The excursion in the modified output signal (i.e. the difference between the maximum and minimum values of the modified output signal) therefore provides a measure of the flow-rate of the fluid. The apparatus 10 is calibrated prior to use so that, in use with a particular fluid, a particular excursion in the modified output signal may be directly interpreted as corresponding to a particular value of flow-rate. For particular operating conditions of the apparatus 10, the excursion of the modified output signal is particular to a given fluid, because the constants of proportionality relating to (3) and (4) depend on factors such as the viscosity, heat capacity and thermal conductivity of the fluid. Calibration therefore needs to be re-performed when the apparatus 10 is to be used with a different fluid.

If the source 12 and the AO modulator 16 operate reliably, $P_1$ is constant and $$T_1 \propto \frac{P_1}{\sqrt{v}}.$$

In this case the excursion in the modified output signal provides a measure of flow rate as described above. However it may be the case that the value of $P_1$ drifts during operation of the apparatus 10, resulting an inaccurate measurements of flow-rate. This may be corrected for by periodically operating the AO modulator 16 at frequency $\omega > \sim 200$ Hz so that (4) holds A second modified output signal is obtained, the excursion of which is proportional to $P_1$. The excursion of a first modified output signal is obtained as described above, by operating the AO modulator at a frequency $\omega < \sim 20$ Hz. The ratio of the excursion of the second modified output signal to that of the first is proportional to $v^{1/2}$. Inaccurate measurements of fluid temperature and flow rate arising from drift in the operation of the source 12 and the modulator 16 may thus be avoided. The frequency with which the apparatus 10 needs to be operated in the regime $\omega > \sim 200$ Hz, and the ratio taken of excursions of second and first modified output signals, depends on the rate at which $P_1$ drifts. If accurate measurements of flow-rate are required continuously, a periodically chirped signal may be applied to the modulator and processing apparatus provided to process the signal at 29 to automatically generate flow-rate measurements corrected for drifting in $P_1$.

Using a measurement of the flow-rate of a fluid, the temperature of the fluid may also be deduced. In the regime $\omega < \sim 20$ Hz the lower bound of the temperature fluctuations (2) is related to the ambient temperature $T_{amb}$ of the fluid:

$$T_0 - T_1 = T_{amb} + T_{offset};$$

$T_{offset}$ being an offset temperature which depends on the flow-rate of the fluid and $P_0 - P_1$ (the minimum value of pump power incident on the core of the fibre-laser 20). A measure of $T_0 - T_1$ is provided by the minimum value of the modified output signal.

Figure 2:
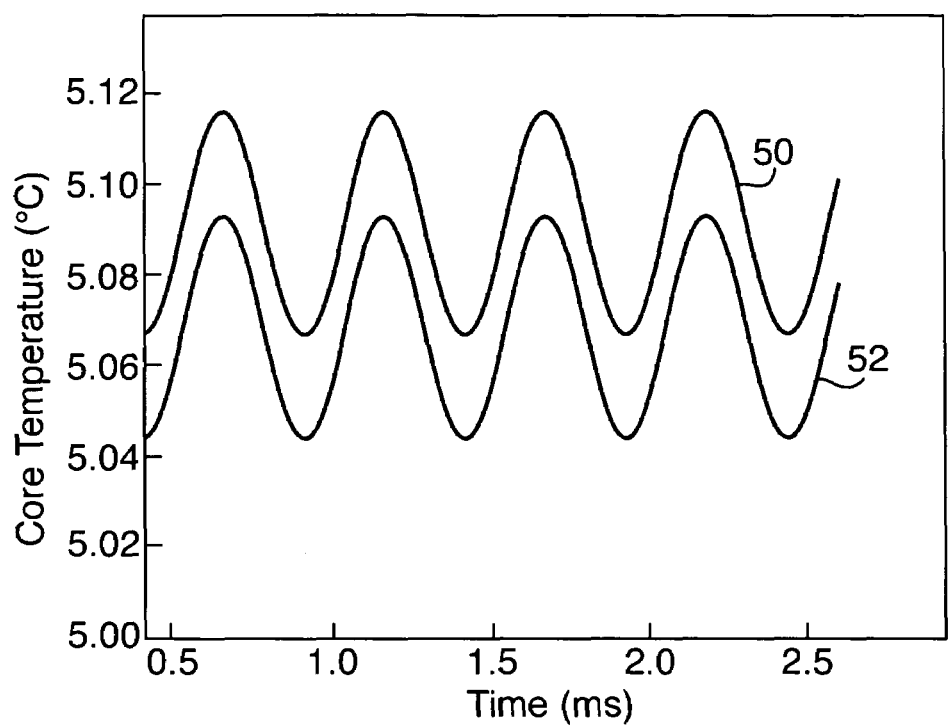
FIGS. 2, 3, 4 and 5 illustrate cyclical heating of the core of a fibre-laser which is comprised in the FIG. 1 apparatus.

In FIG. 2, curve 50 illustrates cyclical heating of the fibre-laser core at the end 19 when the fibre-laser 20 is immersed in a fluid having a flow rate (or flow velocity) of 0.1 $ms_{-1}$ and a temperature of 5° C., and pumped with radiation modulated at 2 kHz. Curve 52 in FIG. 2 illustrates cyclical heating of the core of the fibre-laser 20 when the fibre-laser 20 is immersed in a fluid having a flow rate of 10 $ms^{-1}$ and a temperature of 5° C., and pumped with radiation modulated at 2 kHz.

Figure 3:
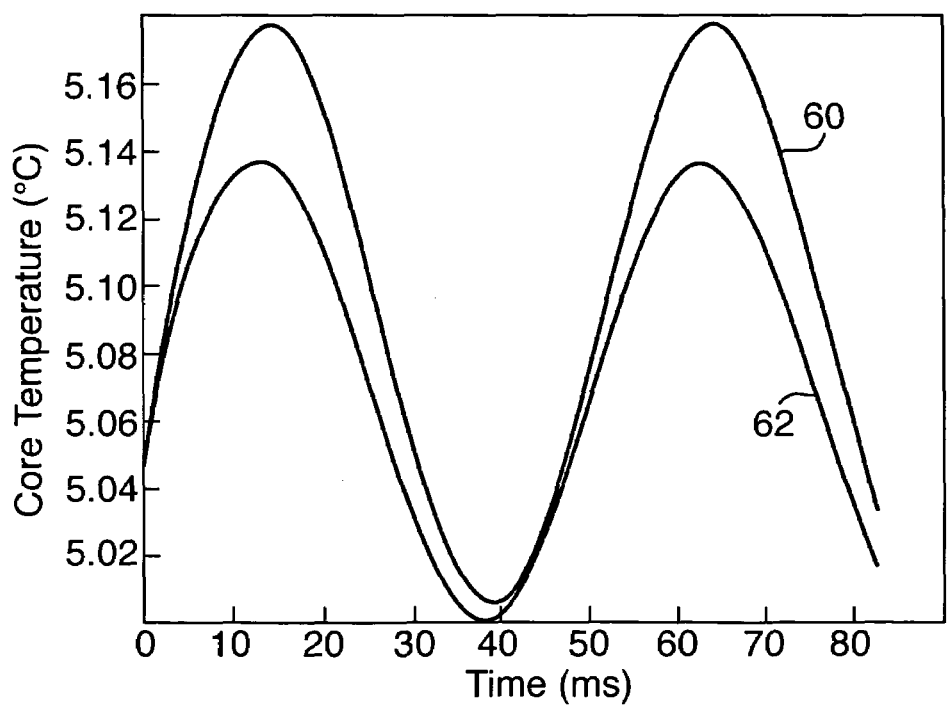

Referring to FIG. 3, curves 60 and 62 illustrate cyclical heating and cooling of the core of the fibre-laser 20 under conditions which are the same as those relating to curves 50 and 52 respectively in FIG. 2, except that radiation from the pump source 12 is modulated at 20 Hz. Comparison of FIGS. 2 and 3 shows that $T_1$ is independent of flow rate when the pump radiation is modulated at 2 kHz, but has a significant dependence on flow rate when the pump radiation is modulated at 20 Hz. $T_0$ is dependent on flow rate both when the pump radiation is modulated at 2 kHz and when modulated at 20 Hz.

Figure 4:
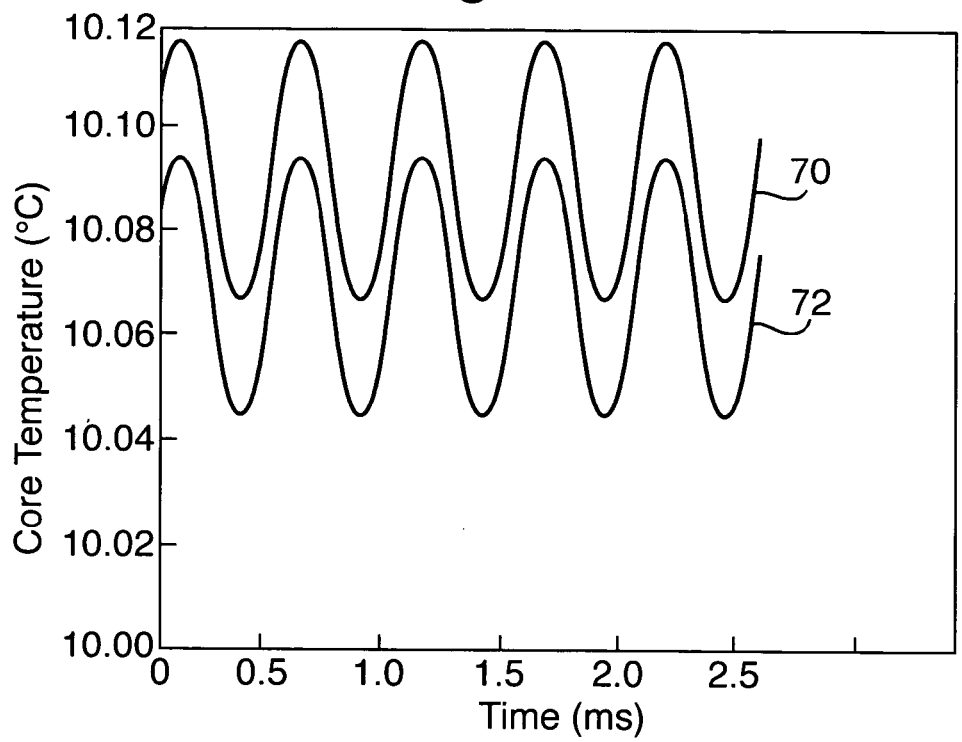
Figure 5:
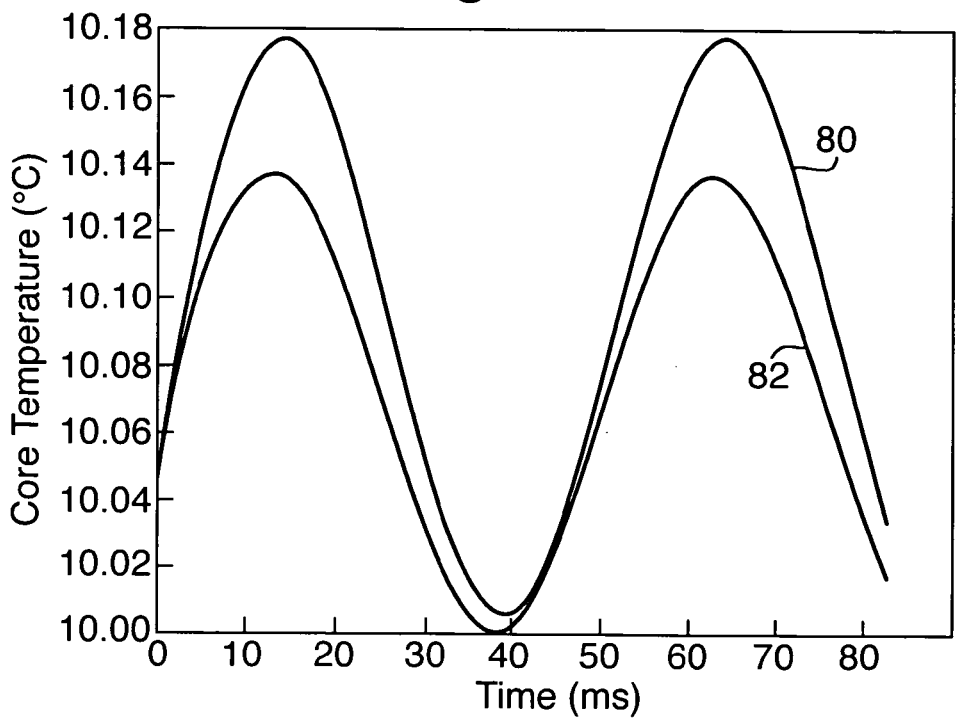

FIGS. 4 and 5 illustrate cyclical heating and cooling of the core of the fibre-laser 20 at the end 19 under the following conditions:

curve 70: flow rate 0.1 $ms_{-1}$, fluid temperature=10° C., pump modulation frequency=2 kHz curve 72: flow rate 10 $ms_{-1}$, fluid temperature=10° C., pump modulation frequency=2 kHz curve 80: flow rate 0.1 $ms^{-1}$, fluid temperature=10° C., pump modulation frequency=20 Hz curve 82: flow rate=10 $ms^{-1}$, fluid temperature=10° C., pump modulation frequency=20 Hz.

FIGS. 4 and 5 again show that the amplitude $T_1$ of the ac component of the core temperature is independent of flow rate when the pump radiation is modulated at 2 kHz, but significantly dependent on flow rate when the pump radiation is modulated at 20 Hz. Furthermore, comparison of FIGS. 2 and 3 with FIGS. 4 and 5 shows that $T_1$ is not significantly dependent upon the temperature of the fluid in which the fibre-laser 20 is situated. However, the $T_0$ does depend on the temperature of the fluid in which the fibre-laser 20 is situated.

Figure 6:
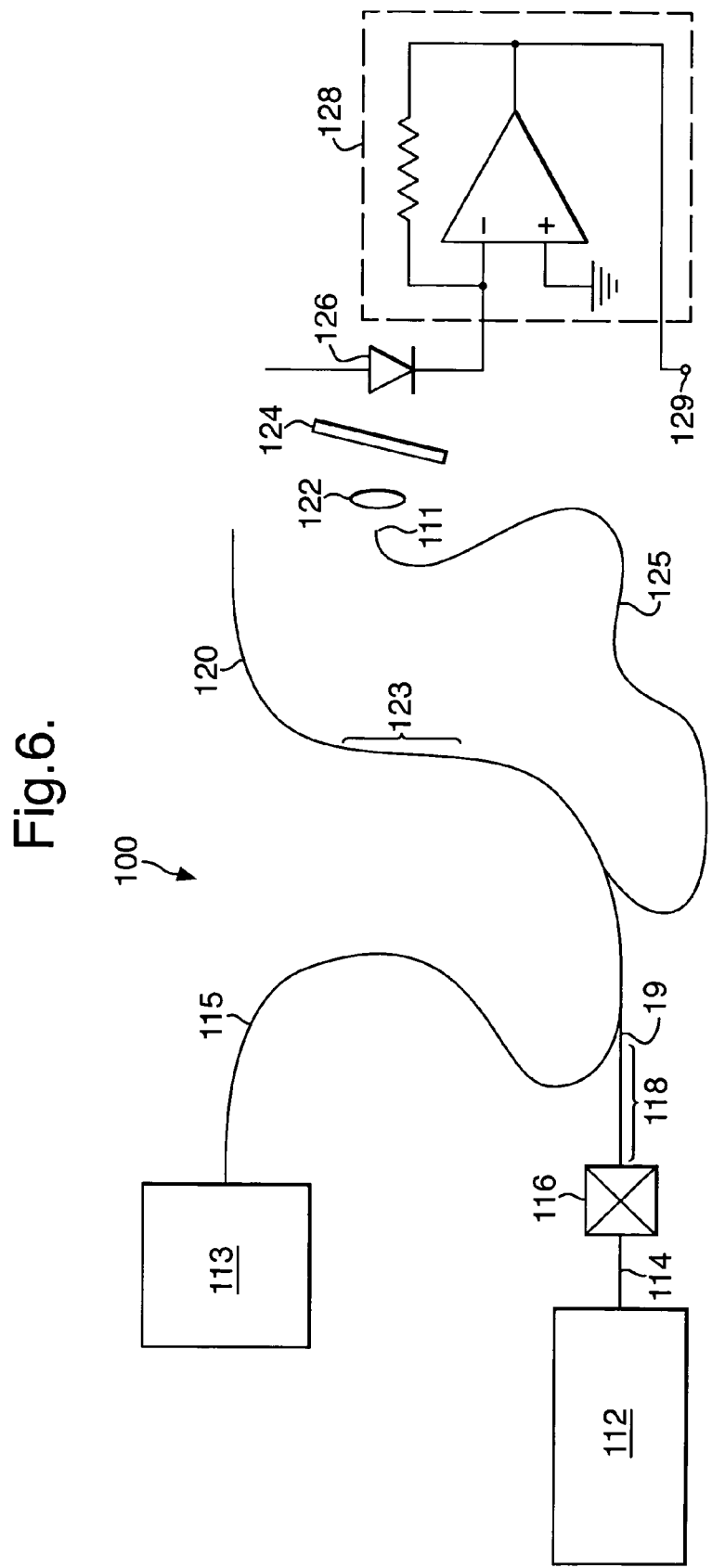
FIG. 6 shows alternative optical sensing apparatus of the invention.

FIG. 6 shows another optical flow sensor of the invention, indicated generally by 100. The sensor 100 has a construction similar to that of the sensor 10; parts of the sensor 100 like to those of the sensor 10 are labelled with reference numerals which differ by a value of 100 from those labelling equivalent parts in FIG. 1. The sensor 100 comprises an optical fibre 120 having a Bragg grating located in its core at a position 123 and a broadband radiation source 113 (e.g. an LED) coupled to an end 119 of the fibre 120 by an optical fibre 115. The core of the fibre 120 is doped with an absorbing species in the region 123. An optical fibre 125 is coupled to the fibre 120 at a position between the end 119 of the fibre 120 and the position 123 at which the Bragg grating is located. A pump source 112 is coupled to the end 119 of the fibre 120 via optical fibres 114, 118 and an AO modulator 116. A lens 122, etalon 124, photodiode 126 and photodiode circuit 128 provide for detection of AM radiation exiting the fibre 125 at an end 111 thereof, and generation of an electrical signal at an output 129 of the circuit 128, as explained above in relation to the sensor 10 of FIG. 1.

To determine the temperature and flow rate of a fluid using the apparatus 100, the region 123 is immersed in the fluid. The apparatus 100 is operated in the same manner as the apparatus 10. Cyclical heating and cooling of the core of the fibre 120 in the region 123 occurs by virtue of absorption of pump radiation from the pump source 112. The optical pitch of reflecting layers in the Bragg grating at region 123 is modulated by the cyclic heating and cooling; hence the wavelength of a spectral component of the broadband radiation emitted by the source 113 and reflected by the Bragg grating into the fibre 125 is modulated by the same mechanism as that modulating the laser radiation output by the fibre laser 20 of the FIG. 1 apparatus. Radiation from the broadband source 113 acts as signal radiation, a reflected spectral component of the radiation corresponding to the pitch of the grating in the region 123.

The difference between the maximum and minimum values of the signal generated at 129 (i.e. the excursion of the signal at 129) corresponds to the flow rate of the fluid. As for the apparatus 10 in FIG. 1, the apparatus 100 is calibrated for use with a particular fluid so that, in use, a given excursion in the signal at 129 may be interpreted as corresponding to a particular flow rate. (It is not necessary to produce a modified output signal from the signal at 129, as the fibre 120 is a passive device, rather than an active (laser) device as is the case for the apparatus 10 of FIG. 1. Variations in the wavelength of radiation coupled into the fibre 125 arise only due to modulation in the optical pitch of the grating at 123.)

Following calibration, the temperature of a fluid may be deduced from the minimum value of the signal at 129 in a manner like to that described above with respect to the apparatus 10 of FIG. 1.

In operation of the apparatus 100 there is no constraint on $P_0$–$P_1$; this quantity may in fact be zero in which case radiation from the pump source 112 is subject to 100% modulation and the lower bound of temperature fluctuations (2) in the core of the fibre 120 corresponds directly to the ambient temperature of the fluid.

The source 113 is "broadband" in the sense that its spectral width is such that, for any pitch of the grating 123 that may occur during operation of the apparatus 100, there is a spectral component of its output that is reflected from the grating 123.

Absorbing species in the fibre-laser 20 and in the optical fibre 120 must be substantially co-located with a reflective grating structure so that absorption within the species causes heating of the grating structure.

The invention claimed is:

1. Optical sensing apparatus (10; 100) comprising
  (i) an optical fibre (20; 120) having a length (18; 123) the core of which contains a reflective grating structure,
  (ii) means (12, 30, 31; 113, 115) for producing signal radiation in the core of the optical fibre, and
  (iii) means (22, 24, 26, 28; 122, 124, 126, 128) for obtaining a measure of the wavelength of signal radiation reflected by the grating structure,
characterised in that the apparatus further comprises heating means (12, 16; 112, 116) for cyclically heating the core of said length of the optical fibre at a frequency such that parameters of the cyclical heating are influenced by the temperature and flow-rate of a fluid in which said length of optical fibre is immersed.

2. Apparatus according to claim 1 wherein, in use of the apparatus, the difference between the maximum and minimum temperatures of the core of said length of the optical fibre is influenced by the flow-rate of the fluid.

3. Apparatus according to claim 2 wherein, in use of the apparatus, the minimum temperature of the core of said length of the optical fibre is influenced by the temperature of the fluid.

4. Apparatus according to claim 3 wherein the heating means comprises a source (12; 112) of radiation coupled to the core of the optical fibre, a modulator (16; 116) for modulating the power of radiation emitted by the source and coupled to the core of the optical fibre, and absorbing species located in the core of the optical fibre for absorbing radiation from the source, the absorbing species being substantially co-located with the reflective grating structure.

5. Apparatus according to claim 4 wherein the modulator is operable to modulate the power of radiation which is output by the source and absorbed in said length of the optical fibre at first and second modulation frequencies, such that modulation at the second modulation frequency results in cyclical heating of said length of the core of the optical fibre wherein the difference between the maximum and minimum temperatures of the core of said length of the optical fibre, and the minimum temperature thereof, are not influenced by the temperature or flow-rate of the fluid.

6. Apparatus according to claim 5 further comprising means for periodically chirping the operating frequency of the modulator between the first and second frequencies.

7. Apparatus according to claim 1 wherein said length of the optical fibre is comprised in a fibre-laser (20), the absorbing species and the wavelength of radiation from the source are suitable for achieving laser oscillation in the fibre-laser, and the signal radiation is laser radiation of the fibre-laser.

8. Apparatus according to claim 7 wherein the fibre-laser is birefringent.

9. Apparatus according to claim 8 further comprising means for obtaining a measure of the difference in wavelength between polarisation modes of the fibre-laser.

10. Apparatus according to claim 1 further comprising a broadband radiation source (113) coupled to the core of the optical fibre (120) at a first position therealong and an output optical fibre (125) coupled to the optical fibre at a second position therealong, the second position being located between the first position and the position of the reflective grating structure.

11. Apparatus according to claim 10 wherein the broadband radiation source is an LED (113).

12. Apparatus according to claim 1 wherein the means for obtaining a measure of the wavelength of signal radiation reflected by the grating structure comprise an interferometer (24; 124) arranged to convert wavelength excursions in reflected signal radiation into corresponding amplitude excursions therein.

13. Apparatus according to claim 12 wherein the interferometer is an etalon.

14. Apparatus according to claim 1 wherein the means for obtaining a measure of the wavelength of signal radiation reflected by the grating structure comprise a photodiode having a wavelength-dependent response or an optical spectrum analyser.

15. A method of measuring at least one of the temperature and the flow rate of a fluid, the method comprising the steps of:
  (i) providing an optical fibre (10; 100) having a length (18; 123) the core of which contains a reflective grating structure;
  (ii) immersing said length of optical fibre in the fluid;
  (iii) generating signal radiation in the core of the optical fibre; and
  (iii) obtaining a measure of the wavelength of signal radiation reflected by the grating structure,
characterised in that the method further comprises the step of cyclically heating the core of said length of the optical fibre at a frequency such that parameters of the cyclical heating are influenced by the temperature and flow-rate of the fluid.

16. The method of claim 15 wherein the difference between the maximum and minimum temperatures of the core of said length of the optical fibre is influenced by the flow-rate of the fluid.

17. The method of claim 16 wherein the minimum temperature of the core of said length of the optical fibre is influenced by the temperature of the fluid.

18. The method of claim 17 wherein the core of said length contains an absorbing species substantially co-located with the reflective grating structure and the step of cyclically heating the core of said length of the optical fibre is performed by carrying out the steps of
  (i) coupling a source of radiation to the core of the optical fibre; and
  (ii) modulating the power or radiation emitted by the source and coupled to the core of the optical fibre.

19. The method of claim 18 further comprising the step of cyclically heating the core of said length of the optical fibre at a frequency such that the difference between the maximum and minimum temperatures of the core of said length of the optical fibre is not influenced by the temperature or flow-rate of the fluid.

20. The method of claim 15 wherein the step of obtaining a measure of the wavelength of signal radiation reflected by the grating structure includes the step of passing said radiation through an interferometer.

21. The method of claim 20 wherein the interferometer is an etalon.

22. The method of claim 15 wherein the step of obtaining a measure of the wavelength of signal radiation reflected by the grating structure includes the step of detecting said radiation with a photodiode having a wavelength-dependent response or with an optical spectrum analyser.

* * * * *